United States Patent [19]

Alex

[11] 4,266,359

[45] May 12, 1981

[54] LONG LINE HOOK ARRANGING APPARATUS

[76] Inventor: Wayne E. Alex, Box 95, Juneau, Ak. 99802

[21] Appl. No.: 82,895

[22] Filed: Oct. 9, 1979

[51] Int. Cl.³ ............................................. A01K 91/06
[52] U.S. Cl. ...................................... 43/6.5; 43/27.4; 43/54.5 A
[58] Field of Search ................. 43/4, 27.4, 6.5, 54.5 A

[56] References Cited

U.S. PATENT DOCUMENTS

| | | | |
|---|---|---|---|
| 3,377,733 | 4/1968 | Godo | 43/4 |
| 3,842,530 | 10/1974 | Jackson | 43/54.5 A |

FOREIGN PATENT DOCUMENTS

| | | | |
|---|---|---|---|
| 102350 | 8/1963 | Norway | 43/6.5 |
| 104806 | 8/1964 | Norway | 43/27.4 |
| 2016881 | 9/1979 | United Kingdom | 43/27.4 |

*Primary Examiner*—Nicholas P. Godici
*Attorney, Agent, or Firm*—Bacon & Thomas

[57] ABSTRACT

A fishing line being drawn around a pulley has spaced hooks hanging downwardly. The hooks are drawn through a chute where they engage a brush which acts to orient all hooks in the same direction as the pulley directs the line away from the chute which pulls the hooks upwardly through the brush while also moving along the chute. The oriented hooks are caused to engage over a fixed bar from which they can slide onto a hook-holding flange on a container in which the line leaving the pulley is being coiled.

6 Claims, 10 Drawing Figures

LONG LINE HOOK ARRANGING APPARATUS

BACKGROUND OF THE INVENTION

This invention is in the field of long line hauling devices particularly for long fishing lines having spaced hooks thereon.

It is common in fishing for certain types of fish to employ long lines of, for example, 1,800 feet with hook lines attached thereto and known as gangions, the hooks are spaced apart along the line. Each of the gangions has a hook at its end. The hooks are baited and the lines let out in the water with suitable anchoring and/or float means at the ends, and left in such position for a length of time to attract and catch fish. On many fishing vessels, from 40 to 50 units are used per day, and setting such lines in the water and hauling the same aboard presents many problems and requires much labor. To perform operations efficiently, it is essential that the lines and hooks, after the fish are removed, be rebaited and repositioned in the water in an efficient manner. It has been known to coil such lines on a reel having spokes to separate the gangions and hooks. However, such devices require much land labor and were not entirely satisfactory. Examples of such prior proposals are shown in the U.S. Pat. Nos. to Tison, 3,626,630, 3,841,011 and 3,903,632. It was even then necessary to effect baiting of the hooks before the lines were deployed again in the water and such baiting is normally done by hand. There have been developed automatic baiting devices, but they require that the hooks be properly oriented before entering the baiting apparatus and that again required much hand labor and danger to the operator.

SUMMARY OF THE INVENTION

The present invention provides apparatus for receiving the lines after the fish have been removed and any old bait removed from the hooks and which apparatus orients the hooks and places them slidably on a bar or flange on the edge of a container in which the lines are coiled. In particular, the lines having the empty hooks thereon are drawn, with the hooks hanging freely downwardly, through a chute in which hook orienting means are provided to insure that all hooks face in the same direction. The lines are then drawn laterally from the chute which causes the hooks to move upwardly and engage slidably on a fixed bar from which they are slid or transferred to a flange on a container in which the lines themselves are coiled. Thus, the coiled lines with the engaged hooks, all properly oriented, may be readily drawn by automatic machinery through automatic baiting devices to put bait on the hooks as the lines are being fed over the ship into the water for further fishing.

In general, the orienting means comprises a brush in the chute which engages the hooks that are improperly oriented and as the hooks move through the chute, they are drawn upwardly through the brush which effects rotation of the hooks to orient them all in the proper direction. The drawing means is generally a grooved pulley which not only draws the line through the chute, but pulls it laterally while hooks are still in engagement with the brush, and thus, the hooks remain properly oriented until they engage on the fixed bar referred to. A further feature of the invention resides in the provision of a multiplicity of similar containers to receive the coiled lines and each having the flange on which the hooks are engaged slidably. It is contemplated that an additional bar may be used to span the ends of the flanges of adjacent containers to facilitate the transfer of hooks from one flange to another for the purpose of inspecting or overhauling and repairing the hooks and line.

DESCRIPTION OF THE PREFERRED EMBODIMENT

Figure 1:
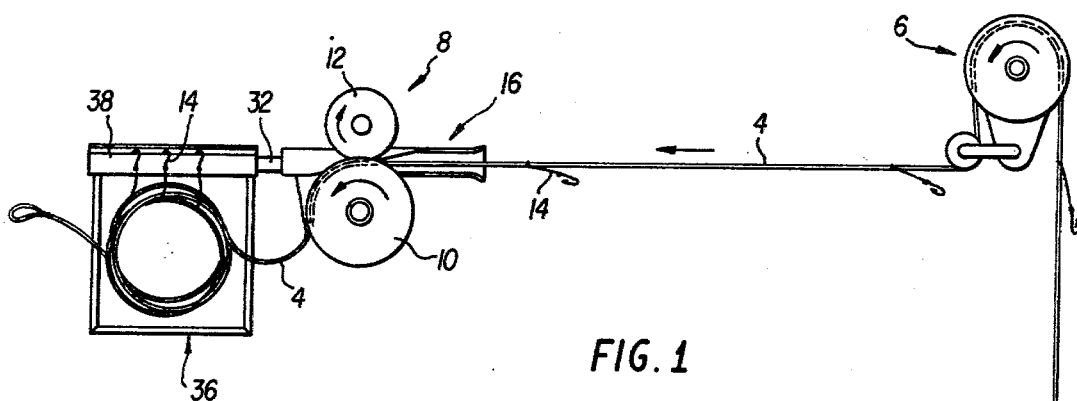
FIG. 1 is a schematic plan view showing the relation of the present invention to other apparatus on the deck of a fishing vessel.

Referring first to FIG. 1, numeral 2 indicates generally a first station on the ship deck at which fish are removed from the hooks of a line 4 being drawn from the water. The line is drawn from the water by apparatus shown at 6, and normally referred to as a gurdy which is a grooved pulley, power driven, and around which the line is coiled and held to apply sufficient friction thereto to draw the line and fish thereon from the water. Numeral 8 indicates generally the apparatus of the present invention, which will be described in more detail with reference to the remaining figures.

Figure 6:
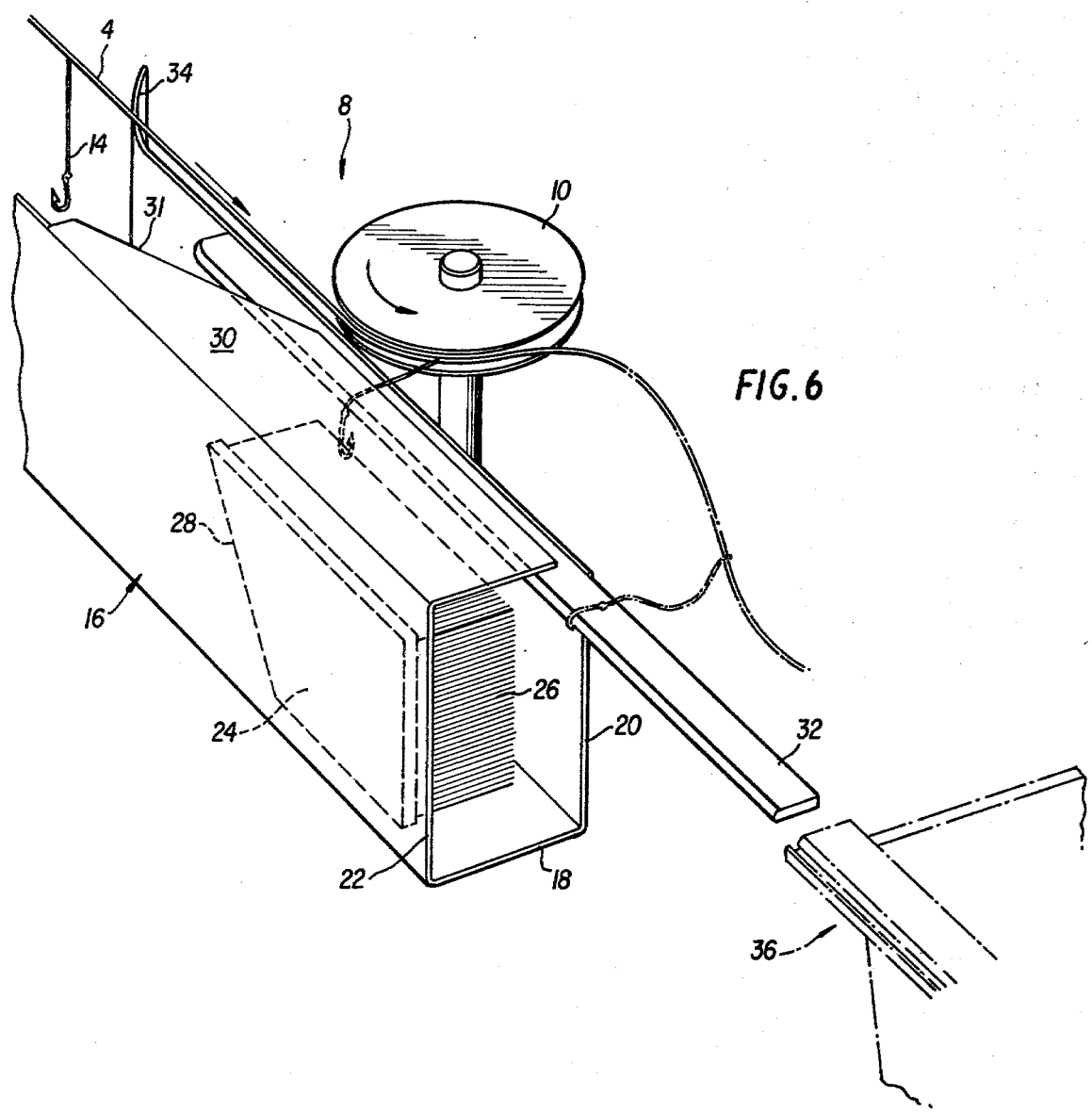
FIG. 6 is a perspective view of a portion of the apparatus of the present invention.

Referring first to FIG. 6, a portion of the apparatus is shown comprising a grooved pulley 10 about which the line 4 is directed. As shown in FIG. 1, a presser pulley or wheel 12 may be employed to force the line 4 into the groove of the pulley 10 and it is preferred that the pulley be so grooved that the line is held therein by friction until forcibly removed. It is contemplated that the pulley 10 be a driven pulley, although it may be rotated by hand if necessary. In any event, the pulley 10 draws the line 4 along a path extending from the gurdy 6, as shown in FIG. 1, and on the line are spaced hooks 14, which depend freely from the line 4. The depending hooks are caused to enter the open end of an upwardly open channel structure 16 comprising a bottom wall 18, an inner side wall 20 and an outer side wall 22. The upwardly open channel structure constitutes a chute into which the depending hooks 14 are directed. Within the chute and fixed to the wall 22 is a brush 24 having inwardly directed resilient bristles 26 directed toward the wall 20, but the ends of which are spaced from that wall. The leading end of the brush 20, that is, the end facing the direction of approach of the hooks 14, is beveled or sloping as at 28 for a purpose to be described.

The wall 22 terminates in an inwardly directed flange 30 directed toward the wheel 10, but spaced slightly above a fixed bar 32 secured to the wall 20 at its upper edge and adjacent the wheel 10, although somewhat below the level thereof. The leading end of the flange 30 is beveled as shown at 31, to insure that all the hooks 14 follow the same path through the chute 16. Preferably, the wall 20 at its leading end is curved outwardly, as shown at 32, to insure entry of the depending hooks 14 into the chute. Also, as clearly shown in FIG. 6, the fixed bar 32 extends downstream from the chute defined by the channel previously described, and is rigidly fixed thereto.

Referring now to FIGS. 7, 8, 9 and 10, FIG. 7 illustrates the apparatus as a depending hook approaches the wheel 10, but has not yet reached tangency therewith. As the hook proceeds along the chute 16, it engages the sloping end of the bristles 16, that is, if the hook is oriented in the direction shown in FIG. 7, and by virtue of its forward motion through the chute, it is rotated about its vertical axis, in the brush, and oriented to the position shown in FIG. 8.

Figure 2:
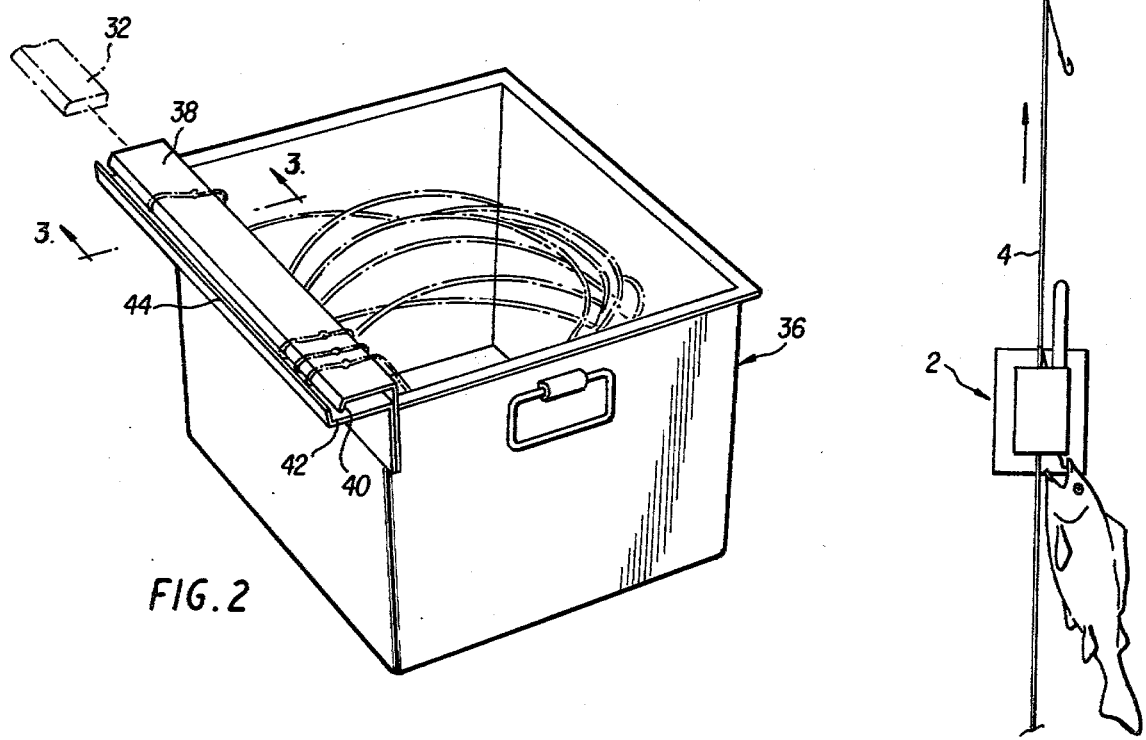
FIG. 2 is a perspective view of a container employed with the present invention.
Figure 3:
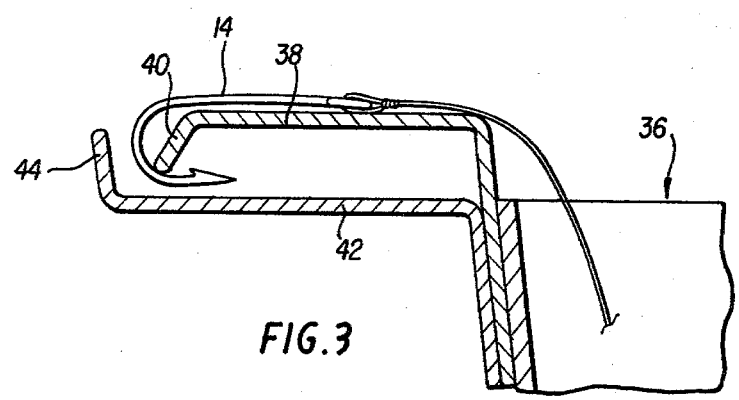
FIG. 3 is an enlarged transverse sectional view taken along the line 3—3 of FIG. 2.
Figure 8:
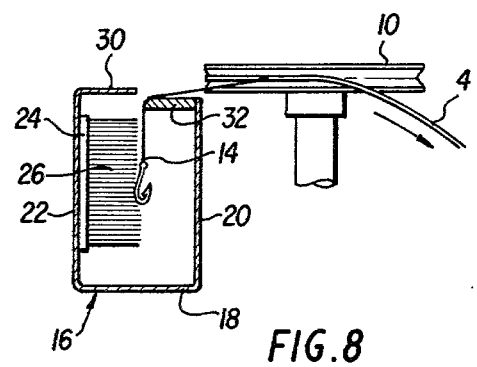
Figure 9:
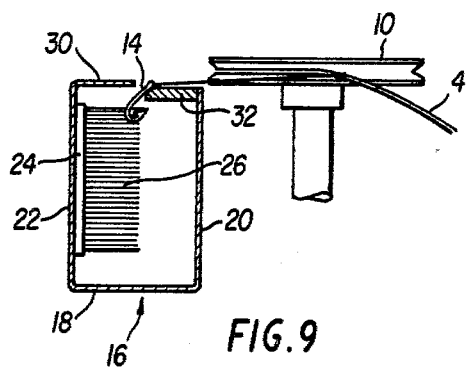
Figure 10:
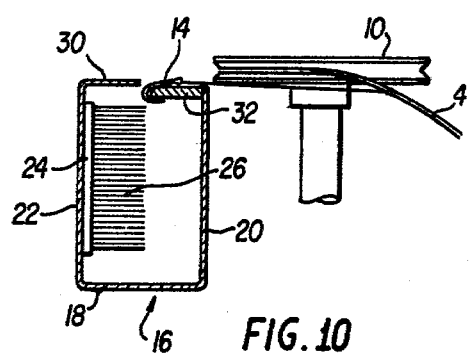

FIG. 8 shows the position of the hook after its attachment to the line 4 has engaged the pulley 10 and moved part way therearound, thus drawing the hook upwardly along the ends of the bristles 26. FIG. 29 shows a further condition of the parts as the pulley 10 continues to rotate and draw the hook upwardly. As shown here the upper end of the rigid hook itself has already engaged the bar 32, which acts as a fulcrum and forces the bent portion of the hook into the bristles 26 to thus insure proper orientation. As the pulley 10 continues to rotate, the hook 14 is drawn into the position shown in FIG. 10, wherein the hook engages on the bar 32, although line 4 has been withdrawn from the groove of the pulley 10. Referring now to FIGS. 2 and 3, an open top container 36 is shown and which is provided at one of its upper edges with an outwardly directed flange 38 having a terminal flange 40 extending downwardly from its outer edge. The flanges 38 and 40 will be referred to as a channel opening downwardly. Also secured to the container 36 is a second or shield flange 42 spaced somewhat below the flange 38 and the edge of flange 40, and extending outwardly therefrom and terminating in an upwardly directed flange 44. The flange 44 is spaced from the flange 40 sufficiently to permit a hook 14 to engage and slide along the downwardly facing channel 38-40 while still preventing movement of the hook off the flange 38-40 in a direction outwardly from the container 36.

Figure 4:
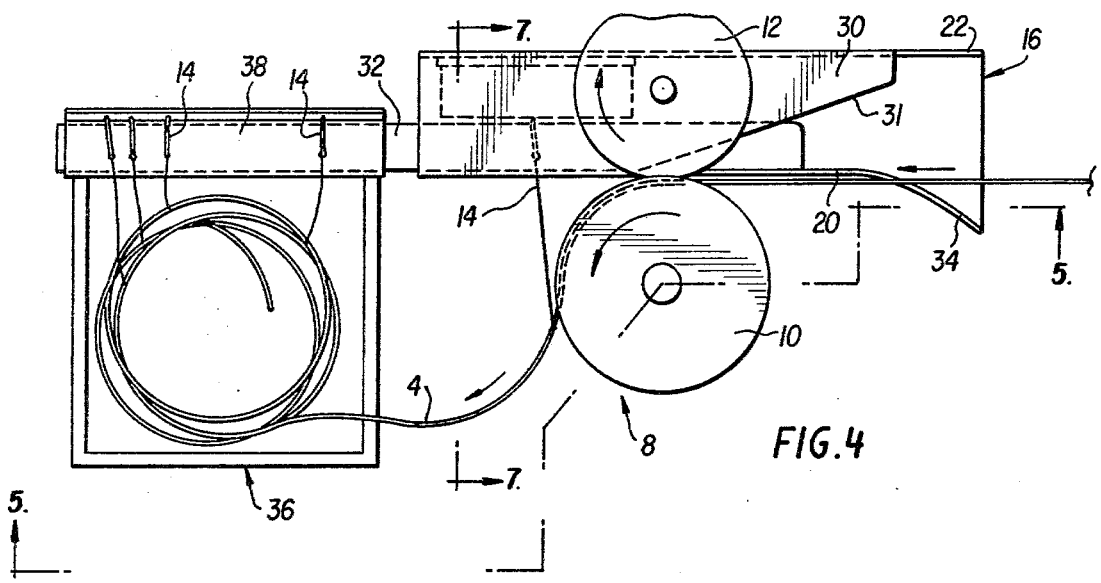
FIG. 4 is a top plan view of the apparatus of the present invention.
Figure 5:
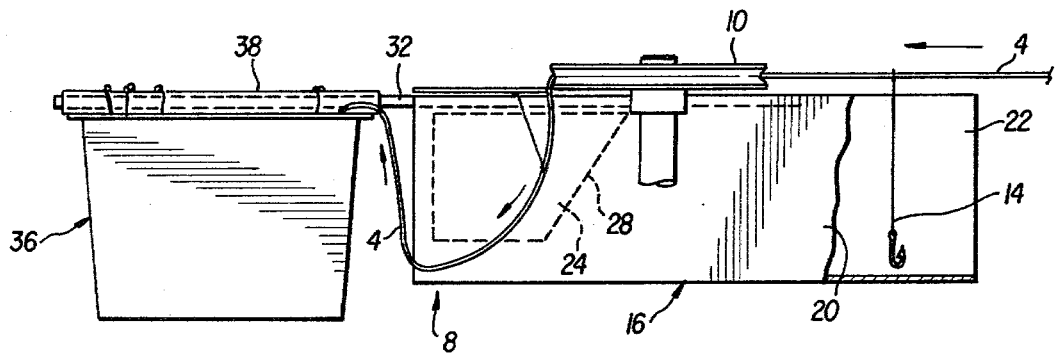
FIG. 5 is a side view of the apparatus of FIG. 4.
Figure 7:
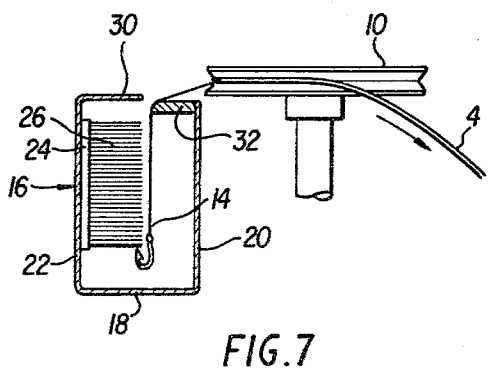
FIGS. 7, 8, 9 and 10 are transverse sectional views taken along the line 7-7 of FIG. 4 showing the parts in different stages of operation.

In operation, it is contemplated that an operator will be positioned adjacent the wheel 10 to insure that the line 4 is released from the pulley 10, after the hooks 14 have engaged the bar 32. That operator will also manually slide the hooks from the bar 32 onto the flange 38 of the adjacent container 36 and will manually coil the line in the container 36, as generally indicated in FIGS. 4 and 5. When the container 36 is filled to capacity, an additional similar or identical container is placed alongside the container 36, and a short bar similar to the bar 32 will be positioned to span the gap that may exist between the flange 38 of the container just filled and the empty container alongside the same. The operator may then slide all of the hooks from the flange of the filled container onto the adjacent empty container and flip the coiled line 4 from the filled container into the adjacent empty one, repairing bent hooks, untangling snarled line, inspecting line for damage and repairing it. Thereafter, the line may be withdrawn sequentially from the containers and the hooks will easily slide off the flanges 38, the line being arranged then to be drawn through an automatic baiting apparatus (not shown) and deployed in the water. Thus, an efficient and rapid sequence of operations may be performed.

While a single specific form of the invention has been shown herein, the same is merely illustrative of the principals involved and other adaptations or forms may be devised within the scope of the appended claims.

What is claimed is:

1. A long line hook arranging apparatus comprising:
   a line hauling wheel arranged to draw a fishing line along a path with spaced hooks on said line depending freely therefrom;
   means defining a guide chute adjacent but below said wheel and extending along said path, said chute having an open end to receive depending hooks moving along said path;
   orienting means in said chute for engaging hooks moving along said path in said chute and orienting all said hooks with their hook portions extending toward said wheel;
   a fixed bar extending generally tangent to said wheel and along the top of said chute adjacent said wheel, said bar extending between said wheel and said hooks whereby, when said line is directed around said wheel away from said chute said oriented hooks successively and slidably engage over said bar;
   an open topped container having an upper edge flange portion in axial alignment with said fixed bar whereby hooks on said fixed bar may be slid therefrom onto said flange while said line leaving said wheel is being coiled in said container, said upper edge flange being in the form of a downwardly open channel overlying and removably embracing an end portion of said fixed bar.

2. A hook arranging apparatus as defined in claim 1 including a shield flange extending from said container below and spaced from said channel and having an outer upstanding flange spaced outwardly of said channel a distance to permit free sliding movement of said hooks on said channel while preventing outward disengagement of said hooks from said channel.

3. A long line hook arranging apparatus comprising:
   a line hauling wheel arranged to draw a fishing line along a path with spaced hooks on said line depending freely therefrom;
   means defining a guide chute adjacent but below said wheel and extending along said path, said chute having an open end to receive depending hooks moving along said path;
   orienting means in said chute for engaging hooks moving along said path in said chute and orienting all said hooks with their hook portions extending toward said wheel; and
   a fixed bar extending generally tangent to said wheel and along the top of said chute adjacent said wheel, said bar extending between said wheel and said hooks whereby, when said line is directed around said wheel away from said chute said oriented hooks successively and slidably engage over said bar,
   said orienting means comprising a multiplicity of resilient bristles, in the form of a brush, extending inwardly of said chute from the side thereof opposite said wheel.

4. A hook arranging apparatus as defined in claim 3 wherein the end of said brush facing the direction of approach of said hooks slopes downwardly and away from said direction.

5. A hook arranging apparatus as defined in claim 4 wherein said chute is in the form of an upwardly open channel, said fixed bar being on the upper edge of the side of said channel adjacent said wheel with said brush bristles extending generally horizontally from the other side of said channel, and an upper guide flange extending from said other side toward said wheel at a level above said fixed bar.

6. A hook arranging apparatus as defined in claim 5 wherein the end of said upper guide flange facing the direction of approach of said hooks slopes from said other side of said chute toward said wheel whereby to direct said hooks toward said fixed bar.

* * * * *